United States Patent [19]
Mehta

[11] Patent Number: 5,965,241
[45] Date of Patent: Oct. 12, 1999

[54] ELECTROLUMINESCENT DEVICES AND PROCESSES USING POLYTHIOPHENES

[76] Inventor: Parag G. Mehta, 7 Nathan's Way, Peabody, Mass. 01960

[21] Appl. No.: 08/111,657

[22] Filed: Aug. 25, 1993

[51] Int. Cl.$^6$ ...................................................... B32B 3/00
[52] U.S. Cl. .......................... 428/195; 428/690; 428/917; 313/503; 313/504; 252/301.16; 252/301.21; 252/301.34; 252/301.35
[58] Field of Search ..................................... 313/503, 504; 428/195, 690, 917; 252/301.16, 301.21, 301.34, 301.35

[56] References Cited

U.S. PATENT DOCUMENTS

| | | | |
|---|---|---|---|
| 3,621,321 | 11/1971 | Williams et al. | 313/108 A |
| 4,775,820 | 10/1988 | Eguchi | 313/504 |
| 5,104,749 | 4/1992 | Sato | 313/504 |

FOREIGN PATENT DOCUMENTS

WO 90/13148  11/1990  WIPO .

OTHER PUBLICATIONS

Braun et al., J. Appl. Phys. 72(2), 564–568 (1992).
Chen and Rieke, J. Am. Chem. Soc., 114, 10087–88 (1992).
McCullough and Lowe, J. Chem. Soc., Chem. Commun., 1992, 70–72.
Ohmori et al., Jap. J. Appl. Phys. 30(11B), L1938–L1940 (1991).
Ohmori et al., Solid State Commun. 80(8), 605–608 (1991).

*Primary Examiner*—William Krynski
*Attorney, Agent, or Firm*—David J. Cole

[57] ABSTRACT

Electroluminescent devices have, as the active layer, a polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent. Such devices give better electroluminescent performance than similar devices using a poly(3-substituted thiophene) having a lower head-to-tail ratio.

18 Claims, No Drawings

ELECTROLUMINESCENT DEVICES AND PROCESSES USING POLYTHIOPHENES

BACKGROUND OF THE INVENTION

This invention relates to electroluminescent devices containing polymers, and to processes for the use of these devices.

In recent years, a great deal of research has been conducted into electroluminescent materials, that is to say materials which emit electromagnetic radiation (typically visible light) when an electric current flows through the material. Electroluminescent materials are potentially useful for the construction of image display devices, which could be very thin and lightweight, and could thus advantageously replace cathode ray tubes, gas plasma displays, liquid crystal displays and other types of image display devices.

Several different types of electroluminescent materials are known; see, generally as to development of such materials, International Patent Application No. PCT/GB90/00584 (Publication No. WO 90/13148). The first type to be developed was inorganic semiconductor materials such as gallium phosphide and zinc sulfide. However, such inorganic electroluminescent materials are not readily usable in large image display devices, and many of them suffer from practical drawbacks, including poor reliability. Accordingly, much recent research has concentrated on organic electroluminescent materials.

Many organic compounds, especially polycyclic arenes such as anthracene, perylene, pyrene and coronene, are electroluminescent. However, electroluminescent devices using these monomeric organic compounds suffer from poor reliability, and these organic compounds present difficulties in preparing the thin layers of the materials needed for use in practical electroluminescent image display devices, and the electrodes needed for electrical contact with such layers. Techniques such as sublimation of the organic material produce layers which are soft, prone to recrystallization and unable to support high temperature deposition of electrode layers, while techniques such as Langmuir-Blodgett film deposition produce films of poor quality, dilution of the active material and high cost of fabrication. Prior art electroluminescent devices formed from these materials, such as that described in U.S. Pat. No. 3,621,321, typically suffer from high power consumption and low light output.

Attempts have also been made to use solid solutions of non-polymeric organic electroluminescent materials in non-electroluminescent polymers as the active layer in electroluminescent devices; see, for example, U.S. Pat. No. 4,356,429. However, use of such solid solutions carries a substantial risk of phase separation by crystallization of the electroluminescent material out of the polymer, especially in environments where the electroluminescent device may be subjected to large changes in temperature. In addition, often it is difficult to find a non-electroluminescent polymer which can both conduct electricity and dissolve a large proportion of the active electroluminescent material to form the necessary solid solution. Finally, the use of a solid solution necessarily involves substantial dilution of the active electroluminescent material and thus lowers the maximum light flux from a given area of the electroluminescent device.

Accordingly, research has been carried out on electroluminescent polymers having an electroluminescent group incorporated into the polymer itself. These polymers do not suffer from the phase separation, solubility and stability problems encountered with the aforementioned solid solutions. Among the polymers which have been tested for use in electroluminescent devices are poly(3-substituted thiophenes); see, for example:

Braun et al., Electroluminescence and electrical transport in poly(3-octylthiophene) diodes, J. Appl. Phys. 72(2), 564 (1992);

Ohmori et al., Visible-Light Electroluminescent Diodes Utilizing Poly(3-alkylthiophene), Jap. J. Appl. Phys. 30(11B), 1938 (1991) (hereinafter "Ohmori I"); and Ohmori et al., Effects of alkyl chain length and carrier confinement layer on characteristics of poly(3-alkylthiophene) electroluminescent diodes, Solid State Commun. 80(8), 605 (1991) (hereinafter "Ohmori II").

However, the electroluminescent performance of the poly (3-alkylthiophenes) described in the above papers is inferior to certain other electroluminescent polymers known in the art.

It has now been found that the electroluminescent performance of poly(3-alkylthiophenes) is greatly affected by the head-to-tail ratio of the polymer, and that improved electroluminescent performance can be achieved using a poly(3-alkylthiophene) having a head-to-tail ratio of at least about 80 percent.

SUMMARY OF THE INVENTION

This invention provides a process for generating electromagnetic radiation, which process comprises:

providing first and second electrodes;

providing a layer of an electroluminescent polymer disposed between, and in electrical contact with, the first and second electrodes, the electroluminescent polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent; and applying a potential difference between the first and second electrodes sufficient to cause current to flow from the first electrode to the second electrode and electromagnetic radiation to be emitted from the layer of electroluminescent polymer.

This invention also provides an electroluminescent device comprising a first electrode, and a second electrode having a work function different from that of the first electrode, the device further comprising a layer of an electroluminescent polymer disposed between, and in electrical contact with, the first and second electrodes, the electroluminescent polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent.

DETAILED DESCRIPTION OF THE INVENTION

The term "head-to-tail ratio" is used in its conventional sense with regard to poly(3-substituted thiophenes) to refer to the ratio of the number of 2,5-thiophene linkages to the total number of thiophene linkages. The head-to-tail ratio of a poly(3-substituted thiophene) can readily be determined by proton nuclear magnetic resonance (NMR) spectroscopy, as described in, for example:

McCullough and Lowe, Enhanced Electrical Conductivity in Regioselectively Synthesized Poly(3-alkylthiophenes), J. Chem. Soc., Chem. Commun., 1992, 70.

The poly(3-substituted thiophenes) used in the present invention have a head-to-tail ratio of at least about 80 percent, preferably at least about 90 percent, and most desirably above 95 percent. From experiments to date, it appears that the electroluminescent characteristics of the polymer continue to improve as the head-to-tail ratio is increased above 90 percent.

The processes for the preparation of poly(3-substituted thiophenes) described in the aforementioned Braun et al. and Ohmori II papers (which use ferric chloride catalyzed oxidative coupling of a 3-substituted thiophene monomer) do not yield polymers with head-to-tail ratios high enough to be used in the present invention. However, poly(3-substituted thiophenes) with head-to-tail ratios of at least 80 percent can be synthesized by the processes described in the aforementioned McCullough and Lowe paper and in:

McCullough and Lowe, Polym. Prepr. (Am. Chem. Soc., Div. Polym. Chem.) 33(1), 195 (1992).

The processes described in these two McCullough and Lowe papers involve treatment of a 2-halo-3-substituted thiophene monomer with lithium diisopropylamide in tetrahydrofuran at −40° C. to produce the corresponding 2-halo-5-lithium-3-substituted thiophene, followed by treatment of this product with a magnesium halide etherate to give the corresponding 2-halo-5-halomagnesium-3-substituted thiophene. The latter compound is then self-condensed, with nickel 1,3-bis (diphenylphosphino)propane dichloride as catalyst, to give the poly(3-substituted thiophene) polymer. Head-to-tail ratios above 90 percent can be achieved.

The 3-substituent of the polythiophenes used in the present invention can be an alkyl group, a cycloalkyl group (for example, a cyclohexyl group), an alkoxy group (for example, a hexoxy group), a cycloalkoxy group (for example, a cyclohexoxy group), an alkoxyalkyl group (for example, an ethoxyethyl group), a silyloxy group, a fluorocarbon group (for example a perfluorohexyl group) or a heteroorganic group (for example a piperidino group). In general, it is desirable that the 3-substituent not contain more than about 15 carbon atoms, and a preferred group of polythiophenes for use in the present invention are those in which the 3-substituent is an alkyl group containing from about 6 to about 15 carbon atoms. The presence of higher alkyl substituents on the polythiophene tends to increase the solubility of the polymer in most organic solvents, and thus renders it easier to form solutions of the polymer and deposit films from such solutions, as required by most conventional techniques for the production of electroluminescent devices. The polythiophenes can be either homopolymers or copolymers formed from a plurality of thiophenes having differing 3-substituents, and such copolymers may be of either the random or block type.

Incorporation of the polymers of the present invention into electroluminescent devices can be effected by conventional techniques. Essentially, a thin film (typically having a thickness in the range of about 30 to about 500 nm) is placed between a pair of electrodes; in some preferred form of the present devices, at least part of one of the electrodes is made transparent so that light emitted from the polymer by electroluminescence can leave the device. The thin film is typically formed by coating one electrode with a solution of the electroluminescent polymer in an appropriate solvent, the thickness of this layer of solution being controlled by spin coating or other techniques known in the art, and the solution is allowed to dry to form the layer of polymer on the electrode. More than one layer of polymer may be used between the electrodes, if desired. Care must be taken that the polymer layer produced is substantially free from defects which may allow short circuits between the electrodes. Following the formation of the layer of polymer on one electrode, the other electrode may be formed on, or secured to, the opposed side of the polymer layer; typically, the second electrode will be formed by direct deposition of metal vapor onto the polymer layer under high vacuum.

As in prior art electroluminescent devices, in the electroluminescent devices of the present invention it is generally advantageous to incorporate, between the polymer layer and the electrodes, additional layers to facilitate injection of holes and/or electrons into the polymer layer. Thus, advantageously, the present electroluminescent devices comprise at least one of a non-metallic hole injecting layer interposed between the first electrode (the anode in operation) and the electroluminescent polymer, and a non-metallic electron-injecting layer interposed between the second electrode (the cathode) and the electroluminescent polymer. The hole-injecting layer and electron-injecting layer used in the present electroluminescent devices can be of the same types as those used in prior art electroluminescent devices. Thus, the hole-injecting electrode should desirably be formed from a material having a high work function compared with the electroluminescent layer, for example indium/tin oxide, platinum, nickel, palladium, gold or graphite. On the other hand, the electron-injecting electrode should desirably be formed from a material having a low work function relative to the electroluminescent layer.

Thus, the present invention provides electroluminescent devices, and processes for their use, which have improved performance as compared with prior art devices and processes employing polythiophenes. The polymers used in the devices and processes of the invention can be synthesized readily.

The following Example is now given, though by way of illustration only, to show details of particularly preferred reagents, conditions and techniques used in the electroluminescent devices and processes of the present invention.

EXAMPLE

A control poly(3-hexylthiophene), hereinafter called Polymer A, was synthesized by oxidation of the corresponding monomer with ferric chloride and was found by proton NMR to have a head-to-tail ratio of about 70 percent. A second poly(3-hexylthiophene), hereinafter called Polymer B, was synthesized by the method described in the aforementioned McCullough and Lowe papers, and found by proton NMR to have a head-to-tail ratio of about 90 percent.

To produce electroluminescent devices from these polymers, a 2 weight percent solution of each polymer was prepared in toluene. The electrodes used were of indium tin oxide (ITO) coated glass. The coated glass was washed using a detergent bath in an ultra-sonicator for at least 30 minutes, then thoroughly rinsed with distilled water and dried, either in an oven at 110° C. for 2 hours or in the vapors of refluxing isopropanol for 30 minutes, and stored in a nitrogen-filled glove bag before use. The ITO electrodes were rinsed with toluene at 1500 rpm for 90 seconds, and immediately spin coated with a solution of the polymer in toluene at 2000 rpm for 90 seconds. The electrode was then dried at 90° C. for 30 minutes, and a second electrode was formed on the polymer layer by depositing 200 nm (nominal) of magnesium, followed by 400 nm (nominal) of aluminum, both by metal evaporation.

The electroluminescent properties of the devices thus produced were then tested using an apparatus which permitted variation of the voltage applied across the device and recording of the current passing through the device. The light emitted from the device fell on a calibrated photodetector having known sensitivity/wavelength properties, and the slope efficiencies obtained from the photodetector measurements were converted to quantum efficiencies. The results obtained are shown in the Table below. In this Table, 6 mA was passed through the devices on the first run, 25 mA on the tenth run, the turn-on voltage is for 6 mA passing through the device, and $\lambda_e$ is the wavelength of maximum electroluminescent emission.

TABLE

| Polymer | Quantum efficiency, percent (first run) | Quantum efficiency, percent (tenth run) | Turn-on voltage (V) | $\lambda_e$ |
|---|---|---|---|---|
| A (Control) | $3 \times 10^{-5}$ | $5 \times 10^{-6}$ | 5.0 | 625 |
| B | $7 \times 10^{-5}$ | $1.6 \times 10^{-4}$ | 2.8 | 660 |

The maximum quantum efficiency which was obtained from a device using Polymer A was $5 \times 10^{-5}$ when 75 mA current was passed through the device, while the maximum quantum efficiency which was obtained from a device using Polymer B was $2 \times 10^{-4}$ when 25 mA current was passed through the device.

From this data, it will be seen that the electroluminescent properties of the device of the present invention prepared from Polymer B were markedly superior to those of the prior art device prepared from Polymer A. The device of the present invention displayed a reduced turn-on voltage, longer wavelength emission (which is desirable for practical reasons; for good color quality in a multicolor display, red emission at about 650 nm is preferred) and substantially greater quantum efficiency, which was more stable during repeated runs than the quantum efficiency of the prior art device.

I claim:

1. A process for generating electromagnetic radiation, which process comprises:

providing first and second electrodes;

providing a layer of an electroluminescent polymer disposed between, and in electrical contact with, the first and second electrodes, the electroluminescent polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent; and applying a potential difference between the first and second electrodes sufficient to cause current to flow from the first electrode to the second electrode and electromagnetic radiation to be emitted from the layer of electroluminescent polymer.

2. A process according to claim 1 wherein the poly(3-substituted thiophene) has a head-to-tail ratio of at least about 90 percent.

3. A process according to claim 2 wherein the poly(3-substituted thiophene) has a head-to-tail ratio of at least about 95 percent.

4. An electroluminescent device comprising a first electrode, and a second electrode having a work function different from that of the first electrode, the device further comprising a layer of an electroluminescent polymer disposed between, and in electrical contact with, the first and second electrodes, the electroluminescent polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent.

5. An electroluminescent device according to claim 9 wherein the poly(3-substituted thiophene) has a head-to-tail ratio of at least about 90 percent.

6. An electroluminescent device according to claim 5 wherein the poly(3-substituted thiophene) has a head-to-tail ratio of at least about 95 percent.

7. A process for generating electromagnetic radiation, which process comprises:

providing first and second electrodes;

providing a layer of an electroluminescent polymer disposed between, and in electrical contact with, the first and second electrodes, the electroluminescent polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent and not more than about 90 percent; and applying a potential difference between the first and second electrodes sufficient to cause current to flow from the first electrode to the second electrode and electromagnetic radiation to be emitted from the layer of electroluminescent polymer.

8. A process according to claim 7 wherein the 3-substituent of the poly(3-substituted thiophene) contains not more than about 15 carbon atoms.

9. A process according to claim 8 wherein the 3-substituent of the poly(3-substituted thiophene) is an alkyl group containing from about 6 to about 15 carbon atoms.

10. A process according to claim 7 wherein the poly(3-substituted thiophene) has been prepared by self-condensation of a 2-halo-5-halomagnesium-3-substituted thiophene.

11. A process according to claim 7 wherein at least part of at least one of the first and second electrodes is substantially transparent, so that at least electromagnetic radiation emitted from the layer of electroluminescent polymer passes through said substantially transparent part of said electrode(s).

12. A process according to claim 7 further comprising:

providing at least one of a non-metallic hole injecting layer interposed between the first electrode and the electroluminescent polymer, and a non-metallic electron-injecting layer interposed between the second electrode and the electroluminescent polymer.

13. An electroluminescent device comprising a first electrode, and a second electrode having a work function different from that of the first electrode, the device further comprising a layer of an electroluminescent polymer disposed between, and in electrical contact with, the first and second electrodes, the electroluminescent polymer comprising a poly(3-substituted thiophene), the 3-substituent of which is an alkyl, cycloalkyl, alkoxy, cycloalkoxy, alkoxyalkyl, fluorocarbon, siloxyl or heteroorganic group, the poly(3-substituted thiophene) having a head-to-tail ratio of at least about 80 percent and not more than about 90 percent.

14. An electroluminescent device according to claim 13 wherein at least part of at least one of the first and second electrodes is substantially transparent.

15. An electroluminescent device according to claim 13 wherein the 3-substituent of the poly(3-substituted thiophene) contains not more than about 15 carbon atoms.

16. An electroluminescent device according to claim 15 wherein the 3-substituent of the poly(3-substituted thiophene) is an alkyl group containing from about 6 to about 15 carbon atoms.

17. An electroluminescent device according to claim 13 wherein the poly(3-substituted thiophene) has been prepared by self-condensation of a 2-halo-5-halomagnesium-3-substituted thiophene.

18. An electroluminescent device according to claim 13 further comprising potential applying means for applying to the first electrode a higher potential than that of the second electrode, and at least one of a non-metallic hole injecting layer interposed between the first electrode and the electroluminescent polymer, and a non-metallic electron-injecting layer interposed between the second electrode and the electroluminescent polymer.

* * * * *

UNITED STATES PATENT AND TRADEMARK OFFICE
CERTIFICATE OF CORRECTION

PATENT NO. : 5,965,241
DATED : October 12, 1999
INVENTOR(S) : Parag G. Mehta

It is certified that error appears in the above-indentified patent and that said Letters Patent is hereby corrected as shown below:

Title page, between the line designated [76] and the line designated [21] insert ---[73] Assignee: Polaroid Corporation:
  Cambridge, Massachusetts---

Signed and Sealed this

Seventeenth Day of April, 2001

Attest:

NICHOLAS P. GODICI

*Attesting Officer*      *Acting Director of the United States Patent and Trademark Office*